Jan. 2, 1962 G. R. LAFRAMBOISE 3,015,424

RECORD DEVICE

Filed May 29, 1959 2 Sheets-Sheet 1

INVENTOR.
GUY R. LAFRAMBOISE

BY Charles P. Boberg
ATTORNEY

Jan. 2, 1962 G. R. LAFRAMBOISE 3,015,424
RECORD DEVICE
Filed May 29, 1959
2 Sheets-Sheet 2
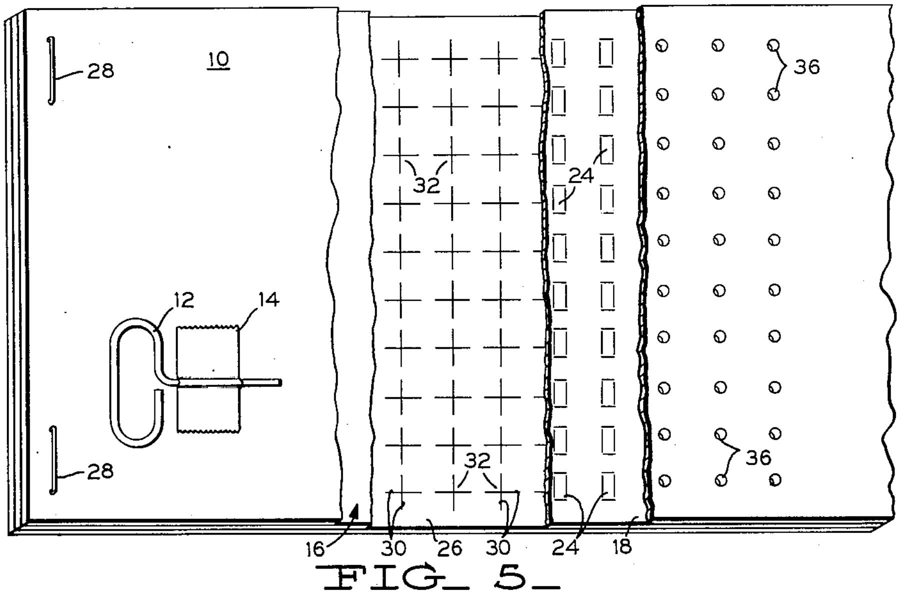
FIG. 5
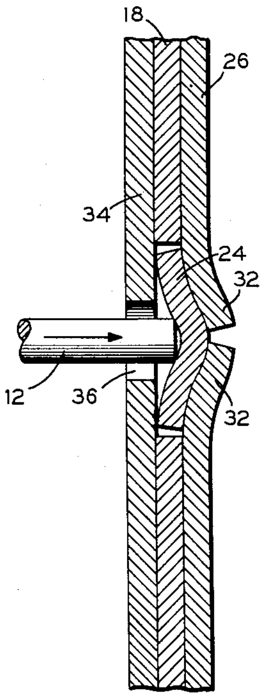
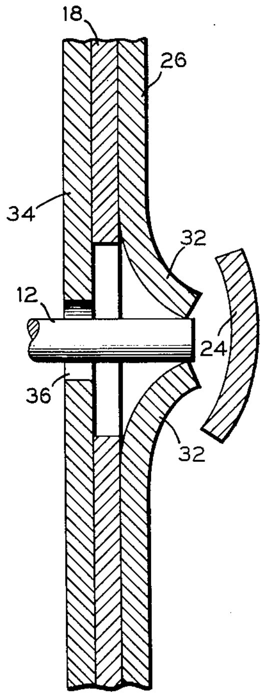
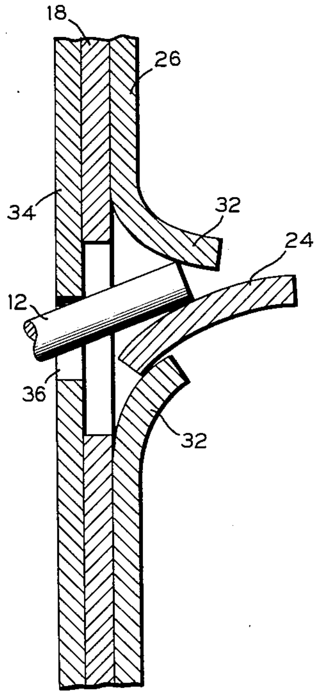
FIG. 6 FIG. 7 FIG. 8

United States Patent Office 3,015,424

Patented Jan. 2, 1962

3,015,424

RECORD DEVICE

Guy R. Laframboise, Vestal, N.Y., assignor to International Business Machines Corporation, New York, N.Y., a corporation of New York Filed May 29, 1959, Ser. No. 816,957
8 Claims. (Cl. 225—93)

This invention relates to tabulating cards or other machine-processable records of the type having index-point areas that are individually scored so that these areas can be removed selectively to form data-representing code holes or openings in the cards.

Cards having scored index-point areas are used extensively in hand punching operations. A manual punching implement can make an accurately shaped and accurately located code hole in such a card even though the tip of the implement is registered only approximately with the desired index point on the card. When punching such cards, care must be taken that the punched-out portions, often referred to as "chips" or "chads," are detached completely from the card. If a chip is left clinging to the card after it supposedly has been punched out, this can cause malfunctioning of the card-controlled machinery in which the punched card is employed.

To insure complete removal of the punched chips from the card in hand punching operations, one may employ an improved type of portable punch board and a manual punching instrument with a specially designed tip, both of which are commercially available at the present time. These items are not of an expendable or readily disposable nature, however, and they are not particularly well suited for "one-time" punching applications, such as opinion polls or audience participation activities, for example, where the user does not wish to retain either the punch board or the punching tool after he has punched the desired information into the card or ballot.

An object of this invention is to provide a novel record device comprising a tabulating card with scored index-point areas associated with a manual punching implement of very simple construction and a backing sheet for the card so constituted as to prevent the punched-out chips from clinging to the card, the latter two elements being inexpensive and readily disposable after the card punching operation is completed.

A further object is to provide an improved, expendable backing member for a card of the aforesaid type which can be used in conjunction with a simple type of punching implement to insure clean punching operations and to prevent the punchouts from clinging to the card.

A feature of this novel backing sheet is the provision of pairs of crossed slits therein, each pair of slits being aligned with a scored index-point area on the card when the set is assembled. The tongues defined by these crossed slits serve to support the aligned chip as it is being punched out, and they will positively retain, out of contact with the card, any punched-out chip that does not pass completely through the backing sheet. These gripping tongues are adapted to cooperate effectively with even a very crude form of punching implement, such as a straightened paper clip, for example.

The foregoing and other objects, features and advantages of the invention will be apparent from the following more particular description of a preferred embodiment of the invention, as illustrated in the accompanying drawings.

Whenever reference is made herein to "punching" a hole in a card, this term should be construed broadly as meaning nothing more than the removal of a scored chip from the card by means of an implement in the nature of a punching tool. The word "punch" is not used herein to denote the formation of a hole by the application of opposed shearing stresses to a defined area of the work piece, as is done with an ordinary punch and die. The above quoted expressions are employed only for convenience, in the absence of a more accurate, commonly accepted terminology.

In the drawings:

FIG. 5 is a perspective, cutaway view of the aforesaid record device, showing the relationship of its constituent elements prior to use.

FIGS. 6, 7 and 8 are enlarged sectional views illustrating various phases of card punching operations that may be performed in accordance with the principles of the invention.

Figure 1:
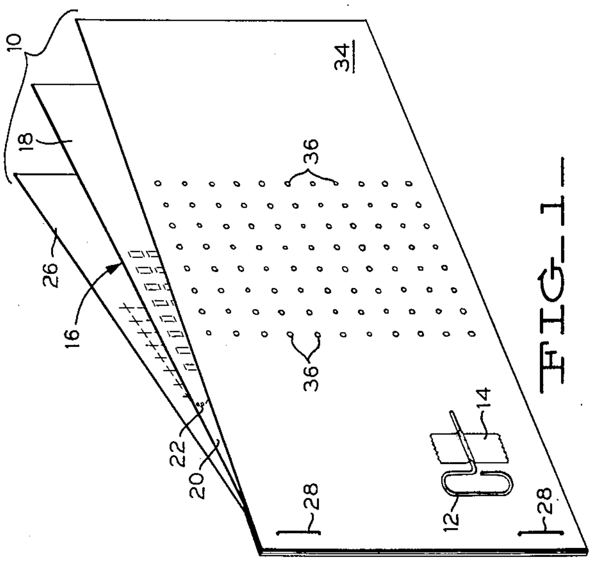
FIG. 1 is a perspective view of a portable assembly of elements which may be employed as a device for making a machine-processable punched record in accordance with the principles of the invention, said device being shown in a partially opened condition to enhance the clarity of illustration.

Referring to FIGS. 1 and 5, the illustrated device comprises a three-layer set of sheets, generally designated 10, and a manual punching implement 12, the latter detachably secured by adhesive tape 14 to the top or front sheet of the set 10. The implement 12 is of very simple construction, consisting, for example, of a straightened paper clip.

Figure 3:
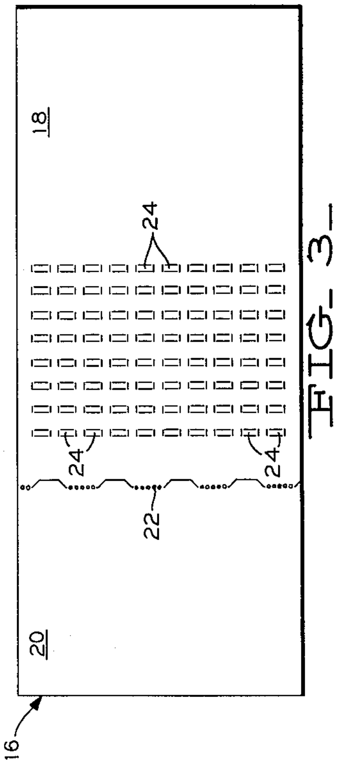

The middle sheet of the set 10 is a card 16, best illustrated in FIG. 3, which has a record card portion 18 and a stub portion 20, these two portions being separated by a tear score line 22 extending across the width of the card 16. The record card 18 is adapted to have holes punched selectively therein to represent data according to a positional code. When separated from the stub 20 following a punching operation, the card 18 constitutes a machine-processable record. In order to facilitate the formation of code holes in the record card 18 by means of a manual punching implement such as 12, the index-point areas in certain columns of the card 18 are individually scored to provide in each such area a chip of card material 24, FIG. 3, which is frangibly connected to the card 18 so that it can readily be removed to form a datum-representing hole in the card 18.

Figure 2:
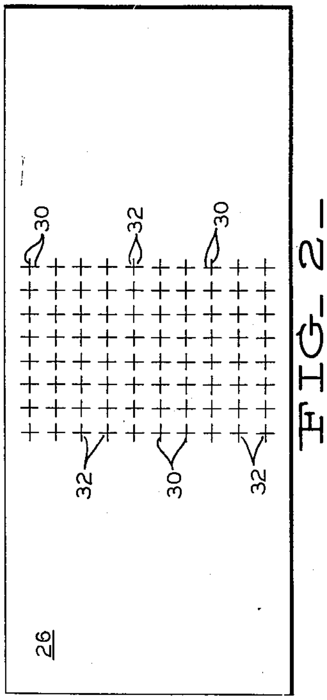
FIGS. 2, 3 and 4 are plan views showing certain constituent elements of the device illustrated in FIG. 1.

At the back or bottom of the set 10, FIGS. 1 and 5, is a backing sheet or stripper 26, which is secured at one end thereof to the stub portion 20 of the card 16 by means of fastening devices such as the staples 28 or by other suitable means, such as adhesive. The backing sheet 26, best illustrated in FIG. 2, is made of a suitable material such as heavy paper or cardstock, and is provided with columns and rows of crossed slits 30 therein respectively corresponding to the columns and rows of scored index areas or chips 24 in the record card 18, FIG. 3. When the set 10 is assembled as shown in FIG. 5, each of the removable chips 24 in the record card 18 is aligned with a pair of the crossed slits or incisions 30 in the backing sheet 26. Each pair of crossed slits 30 defines in the material of the backing sheet 26 a group of four converging tongues 32, the purpose of which will be explained presently. It should be understood that additional columns of crossed slits 30 may be provided in the sheet 26 in order to standardize the design of these backing sheets so that they can be employed in conjunction with record cards of various designs wherein the columns of scored index areas are differently located.

Figure 4:
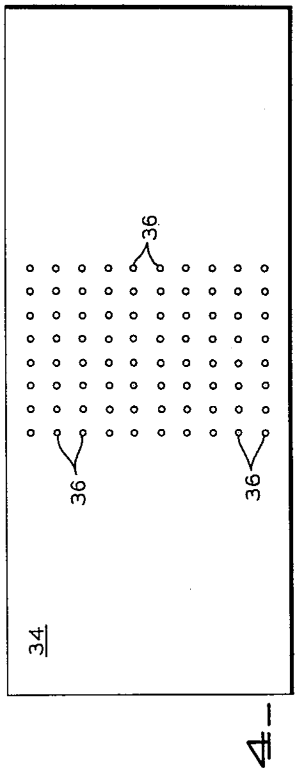

The top or front sheet of the set 10, FIGS. 1 and 5, is a punch guide sheet 34, best illustrated in FIG. 4. This guide sheet 34 is made of a suitable material, such as paper, plastic film or foil, and it has columns and rows of punch guide holes 36 therein respectively corresponding to the columns and rows of the scored index areas or chips 24 in the record card 18. When the set 10 is assembled as shown in FIG. 5, each of the guide holes 36 in the sheet 34 is aligned with a respective one of the chips 24 in the card 18, preferably being located at the center of the chip. In order to standardize the guide sheets 34, each of these sheets may contain columns of guide holes 36 in addition to those illustrated herein so as to accommodate various record cards wherein the columns of scored index areas are differently located, suitable indicia being printed on the guide sheet to denote the punching zone in each case.

When a hole is to be punched in the card 18, the user detaches the punching implement 12 from the set 10, removing the tape 14 from the shank of the implement 12, and inserts the shank of the implement 12 through the appropriate guide hole 36. As shown in greater detail in FIGS. 6, 7 and 8, the tip of the punching implement 12 is pressed against the selected chip 24 for causing the frangible connections between this chip and the card 18 to rupture. In order that the chip 24 will be maintained in a position such that the implement 12 can operate effectively upon it during the initial stage of the punching operation, the corresponding group of tongues 32 is arranged to provide a yielding support for the chip 24, which support is maintained until all of the frangible connections between the chip 24 and the card 18 have been broken. The continued application of pressure to the detached chip 24 causes it to pass between the tongues 32, which by this time have flexed sufficiently to permit the passage of the chip.

If the punching implement 12 engages the chip 24 exactly at its center and moves in a path that is perpendicular to the card 18, the chip 24, under these conditions, can be expected to pass completely through the backing sheet 26 as shown in FIG. 7. However, if the punching implement 12 should engage the chip 24 in an off-center position and at an angle to the perpendicular, as indicated in FIG. 8, the chip 24 probably will not be dislodged completely from the backing sheet 26 and will remain in the grip of the tongues 32 after the implement is withdrawn. It is even possible that under some conditions the chip 24 would still be connected at one end thereof to the card 18, while being gripped at its other end by the tongues 32, after the implement 12 is withdrawn. Regardless of these circumstances, however, the separation of the card 18 from the other members of the set 10 following a punching operation will cause all punched-out chips 24 to be separated completely from the card 18, if they have not already been completely detached therefrom. The card 18 is separated from the other members of the set 10 by being grasped and torn along the score line 22, FIG. 3, preferably being slid lengthwise out of the set 10 after being so separated. Under these conditions it is impossible for any punched-out chip to be left clinging to the card 18 following the detachment of the card 18 from the set 10.

The device illustrated in FIGS. 1 and 5 is especially useful in "one-time" punching applications such as public opinion polls and audience participation activities. It will be noted that the members 12, 26 and 34 are inexpensive, expendable elements which the user can readily disposed of after the card punching operation. With even a crude punching implement, such as the one illustrated herein, the user can accurately form data-representing holes in the record card 18 without any danger that partially punched chips will be left clinging to the card 18 after it has been detached from the set. The fact that chips are left hanging in the backing sheet 26 is immaterial since this backing sheet will not be used again. The record card 18 is the only element of the entire assembly which is intended to have any utility after the punching operation is over.

While the invention has been particularly shown and described with reference to a preferred embodiment thereof, it will be understood by those skilled in the art that various changes in form and details may be made therein without departing from the spirit and scope of the invention.

The invention is claimed as follows:

1. In a portable assembly of elements for use in making a machine-processable punched record, the combination comprising a record card of the type having at least some of its index-point areas individually scored to provide at each such area a chip of card material that can be punched out selectively by a hand punch in accordance with data to be recorded in said card, and a backing sheet of yieldable material having sets of intersecting slits therein aligned with a respective one of said scored index-point areas in said card, converging tongues defined by each set of intersecting slits for yieldingly supporting an aligned chip of card material when the same is being punched out of said card and for holding the punched-out chip in the event it does not pass completely through said backing sheet, whereby such a chip is prevented from clinging to said card when said card and backing sheet are separated following the punching operation.

2. The combination defined by claim 1, wherein said backing sheet is of heavy paper with a pair of crossed slits therein for each of the scored index-point areas in said card.

3. The combination defined by claim 1, further including a punch guide sheet detachably associated with said card on the side thereof opposite the side on which said backing sheet is disposed, said guide sheet having holes therein respectively aligned with said scored index-point areas to guide a hand punch for punching selected chips out of said card.

4. A portable assembly of elements for use in making a machine-processable punched record comprising a manual punching implement, a record card of the type having at least some of its index-point areas individually scored to provide at each such area a chip of card material that can be punched out selectively by said punching implement in accordance with data to be recorded in said card, a backing sheet of yieldable material having groups of crossed slits therein aligned with a respective one of said scored index-point areas in said card, converging tongues defined by each set of intersecting slits for yieldingly supporting an aligned chip of card material when the same is being punched out of said card and for holding the punched-out chip in the event it does not pass completely through said backing sheet, and a punch guide sheet detachably connected to said card on the side thereof opposite the side on which said backing sheet is disposed, said guide sheet having holes therein respectively aligned with said scored index-point areas to guide said implement for punching selected chips out of said card.

5. A portable assembly of elements for use in making a machine-processable punched record comprising a manual punching implement, and a set of three superimposed sheet-like members to which said implement is temporarily attached, the members of said set being as follows: a card divided by a tear score line into a record card portion and a stub portion, said record card portion having certain columns in which the index-point areas are individually scored to provide at each such area a chip of card material that can be punched out selectively by said punching implement in accordance with data to be recorded in said card; a backing sheet disposed on one side of said card and attached at one end thereof to said stub portion, said backing sheet having pairs of crossed slits therein respectively aligned with said scored index-point areas to define in the adjoining material of said backing sheet a plurality of converging tongues for yieldingly supporting an aligned chip of card material when the same is being punched out of said card and for holding the punched out chip in the event it does not pass completely through said backing sheet; and a punch guide sheet disposed on the opposite side of said card and attached at one end thereof to said stub portion, said guide sheet having holes therein respectively aligned with said scored index-point areas to guide said implement for punching selected chips out of said card.

6. An assembly of elements for use in making a machine-processable punched record, comprising a record card having at least some of its index-point areas individually scored, a backing sheet having releasable portions each aligned with a respective one of said scored index-point areas, said releasable portions being adapted to break open in response to the application of a bursting force thereto, a manual punching element for punching out a selected chip from a scored area, the releasable portions providing initial resistance to the passage of a selected chip until sufficient force is exerted by the punching element to burst the releasable portion to permit the chip to pass through the backing sheet.

7. An assembly of elements for use in making a machine-processable punched record, comprising a record card having at least some of its index-point areas individually scored, a plane-surfaced backing sheet of flexible material having sets of intersecting slits each aligned with a respective one of said scored index-point areas, each set of intersecting slits defining a plurality of pivotable tongue portions which normally lie in the plane of said backing sheet, a manual punching element for punching out a selected chip from a scored area, the movable tongue portions being pivoted out of the plane of the backing sheet by the punching element and chip to allow the passage of the chip through said backing sheet.

8. An assembly of elements for use in making a machine-processable punched record, comprising a record card having at least some of its index-point areas individually scored, a backing sheet of flexible material having sets of intersecting slits, each set of intersecting slits defining a plurality of pivotable tongues having cut ends which meet together in alignment with a respective one of said scored index-point areas, a manual punching element for pushing a selected chip out from a scored area and past the tongue ends in alignment therewith, said tongues being pivoted by said punching element and chip so that the tongue ends will engage and hold said chip in the event it is not pushed completely therethrough.

References Cited in the file of this patent

UNITED STATES PATENTS

| | | |
|---|---|---|
| 1,871,597 | English | Aug. 16, 1932 |
| 2,923,452 | Holovka | Feb. 2, 1960 |